(12) United States Patent
Collins et al.

(10) Patent No.: US 7,530,618 B2
(45) Date of Patent: May 12, 2009

(54) VEHICLE CARGO STORAGE SYSTEM

(76) Inventors: Manuel Collins, 145 W. 35th St., Cut Off, LA (US) 70345; Dorrick Prentice, 1300 Bayou Black Dr., Houma, LA (US) 70360

( * ) Notice: Subject to any disclaimer, the term of this patent is extended or adjusted under 35 U.S.C. 154(b) by 0 days.

(21) Appl. No.: 11/187,475

(22) Filed: Jul. 22, 2005

(65) Prior Publication Data

US 2006/0284437 A1   Dec. 21, 2006

Related U.S. Application Data (63) Continuation-in-part of application No. 10/071,786, filed on Feb. 7, 2002, now Pat. No. 7,077,610.

(60) Provisional application No. 60/590,186, filed on Jul. 22, 2004.

(51) Int. Cl.
*B60R 9/06* (2006.01)

(52) U.S. Cl. ........................ 296/37.6; 224/403; 224/534

(58) Field of Classification Search ................ 296/37.1, 296/37.6, 3; 224/281, 282, 400, 403–405, 224/495, 522, 534
See application file for complete search history.

(56) References Cited

U.S. PATENT DOCUMENTS

| | | |
|---|---|---|
| 499,444 A | 6/1893 | Schumann |
| 1,169,635 A | 1/1916 | Grimes |
| 1,247,621 A | 11/1917 | Bennett |
| 1,520,123 A | 12/1924 | Gillen |
| 2,597,857 A | 5/1952 | Francis |
| 2,782,672 A | 2/1957 | Davis |
| 2,877,818 A | 3/1959 | Johnson |
| 3,238,834 A | 3/1966 | Appleberry |
| 3,312,138 A | 4/1967 | Cumming |
| 3,466,965 A | 9/1969 | McCarthy |
| 3,946,636 A | 3/1976 | Grey |
| 4,047,462 A | 9/1977 | Hurtig |
| 4,079,655 A | 3/1978 | Roberson, Jr. |
| 4,293,259 A | 10/1981 | Liebig |
| 4,294,570 A | 10/1981 | Meschnig |
| 4,453,845 A | 6/1984 | Donan, Jr. |
| 4,557,631 A | 12/1985 | Donan, Jr. et al. |
| 4,693,389 A | 9/1987 | Kalen |
| 4,830,242 A * | 5/1989 | Painter .................... 224/42.32 |
| 5,108,141 A * | 4/1992 | Anderson ...................... 296/3 |

(Continued)

FOREIGN PATENT DOCUMENTS

DE    1092415    7/1956

(Continued)

*Primary Examiner*—Glenn Dayoan
*Assistant Examiner*—Gregory Blankenship
(74) *Attorney, Agent, or Firm*—Garvey, Smith, Nehrbass & North, L.L.C.; Charles C. Garvey, Jr.; Seth M. Nehrbass (57) ABSTRACT

A vehicle cargo storage system attaches to a truck bed, providing a plurality of beams that can support individual fasteners (e.g. eyebolts) to which cables can attach for securing a load. Alternatively, a load carrying module having a cargo deck and an under deck storage area is affixable to the beams. Optional devices (e.g. toolbox, grill, table, storage containers/boxes) can be supported upon the cargo deck or under deck storage area of the load carrying module.

31 Claims, 12 Drawing Sheets

U.S. PATENT DOCUMENTS

| | | | |
|---|---|---|---|
| 5,108,240 A | | 4/1992 | Liebig |
| 5,110,021 A | * | 5/1992 | Dawson, Jr. ................. 224/405 |
| 5,509,709 A | * | 4/1996 | Carroll .......................... 296/3 |
| 5,573,495 A | | 11/1996 | Adler |
| 5,597,103 A | * | 1/1997 | Nichols ....................... 224/324 |
| 5,622,299 A | * | 4/1997 | Berard ........................ 224/403 |
| 5,702,215 A | | 12/1997 | Li |
| 5,741,038 A | * | 4/1998 | Fowler et al. .................. 296/3 |
| 5,865,559 A | | 2/1999 | Yang |
| 5,934,725 A | * | 8/1999 | Bowers .................... 296/26.09 |
| 6,056,489 A | | 5/2000 | Keller |
| 6,161,999 A | | 12/2000 | Kaye et al. |
| 6,196,602 B1 | * | 3/2001 | Esplin ........................... 296/3 |
| 6,203,260 B1 | | 3/2001 | Henline et al. |
| 6,283,526 B1 | * | 9/2001 | Keough et al. ........... 296/26.09 |
| 6,318,780 B1 | * | 11/2001 | St. Aubin ................. 296/26.09 |
| 6,340,106 B1 | * | 1/2002 | Dutton ....................... 224/405 |
| 6,390,525 B2 | * | 5/2002 | Carpenter et al. ......... 296/26.09 |
| 6,460,744 B2 | * | 10/2002 | Lance et al. ................. 224/404 |
| 6,629,714 B2 | * | 10/2003 | Campbell .................... 296/37.6 |
| 6,698,634 B2 | * | 3/2004 | Thomson .................... 224/404 |
| 6,698,810 B1 | * | 3/2004 | Lane .............................. 296/3 |
| 6,811,068 B2 | * | 11/2004 | Johnson ...................... 224/404 |
| 6,840,558 B1 | * | 1/2005 | Darbishire et al. ........ 296/26.09 |
| 6,860,536 B1 | * | 3/2005 | Schimunek ............... 296/26.09 |
| 6,866,316 B1 | * | 3/2005 | Harder et al. ............ 296/26.09 |
| 6,913,175 B2 | * | 7/2005 | Martin ....................... 224/403 |
| 7,036,861 B2 | * | 5/2006 | Steffens et al. ............. 296/37.6 |
| 7,090,275 B2 | * | 8/2006 | Pero ........................... 296/37.6 |
| 7,090,287 B1 | * | 8/2006 | Eberst ..................... 296/180.1 |

FOREIGN PATENT DOCUMENTS

| | | |
|---|---|---|
| DE | 1936360 | 7/1969 |
| FR | 1236439 | 9/1959 |

* cited by examiner

VEHICLE CARGO STORAGE SYSTEM

CROSS-REFERENCE TO RELATED APPLICATIONS

Priority of U.S. Provisional Patent Application Ser. No. 60/590,186, filed Jul. 22, 2004, incorporated herein by reference, is hereby claimed. This application is a continuation in part of application Ser. No. 10/071,786 filed Feb. 7, 2002 now U.S. Pat. No. 7,077,610 and hereby incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to truck bed cargo storage systems. More particularly, the present invention relates to an improved vehicle cargo storage system that is attached to the bed of a truck such as a common pick-up truck, wherein a rail system optionally accepts tie down anchors (e.g. eyelets), a platform, modules for storing boxes of different configurations, accessories such as a grill, toolbox and/or table, and optionally providing a multi-level storage arrangement that includes a deck having an under storage area that receives elongated relatively thin boxes and an upper cargo deck that supports accessories such as a toolbox, grill or the like.

2. General Background of the Invention

Trucks such as the common pick-up truck typically provide an elongated bed area that is usually about six and one half to eight feet long (or longer) and that is surrounded by walls that include left and right bed walls, the passenger compartment of the vehicle and a forward bed wall next to it as well as a removable rear wall commonly called a tailgate.

The present invention provides an improved load and cargo carrying system that maximizes storage area for a pick-up truck bed. However, the system of the present invention can be also adapted to other transportation vehicles (e.g. train, truck, marine vessel, aircraft, trailer, rail car) or can optionally be used with certain stationary structures (e.g. a dock, slab, or offshore platform).

BRIEF SUMMARY OF THE INVENTION

The apparatus of the present invention comprises a truck bed load carrying system of improved configuration.

The present invention thus provides a vehicle cargo storage system for use with a vehicle load carrying bed that includes a frame that is attached to the vehicle at its load carrying bed, the frame including a pair of longitudinal beams and one or more transverse beams that define together an overall rectangular shape generally corresponding to the shape of the bed. Each of the beams is hollow, including a beam wall surrounding a bore. A plurality of beam openings extend through the beam wall at spaced apart positions such as for example about one foot apart. Preferably, these beam openings are on the top of the beam wall.

A plurality of tie down fittings are provided that each can removably attach to the beam wall at a selected opening, at least some of these tie down fittings providing eyelets. As an option, one or more accessories are provided that optionally fit the frame. These accessories can include for example a cargo module that is attachable to the frame, the module including an upper deck and a lower cargo carrying receptacle. Other accessories include for example a storage box, a platform, a toolbox, or a barbecue pit as examples.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE PREFERRED EMBODIMENT

In FIGS. 1-4, vehicle and cargo storage system 10 shows a pick-up truck body 11 having a passenger compartment or cab 12, bed 13, bed walls 14, 15, 16, a plurality of wheels 17 and a folding tailgate 18. Such commercially available trucks (e.g. FORD, CHEVROLET, DODGE) having a body 11 as shown are well known. The body 11 can provide a pair of wheel wells 19. Such a prior art known truck is designated generally by the numeral 20 in FIG. 1.

Figures 3, 3A:
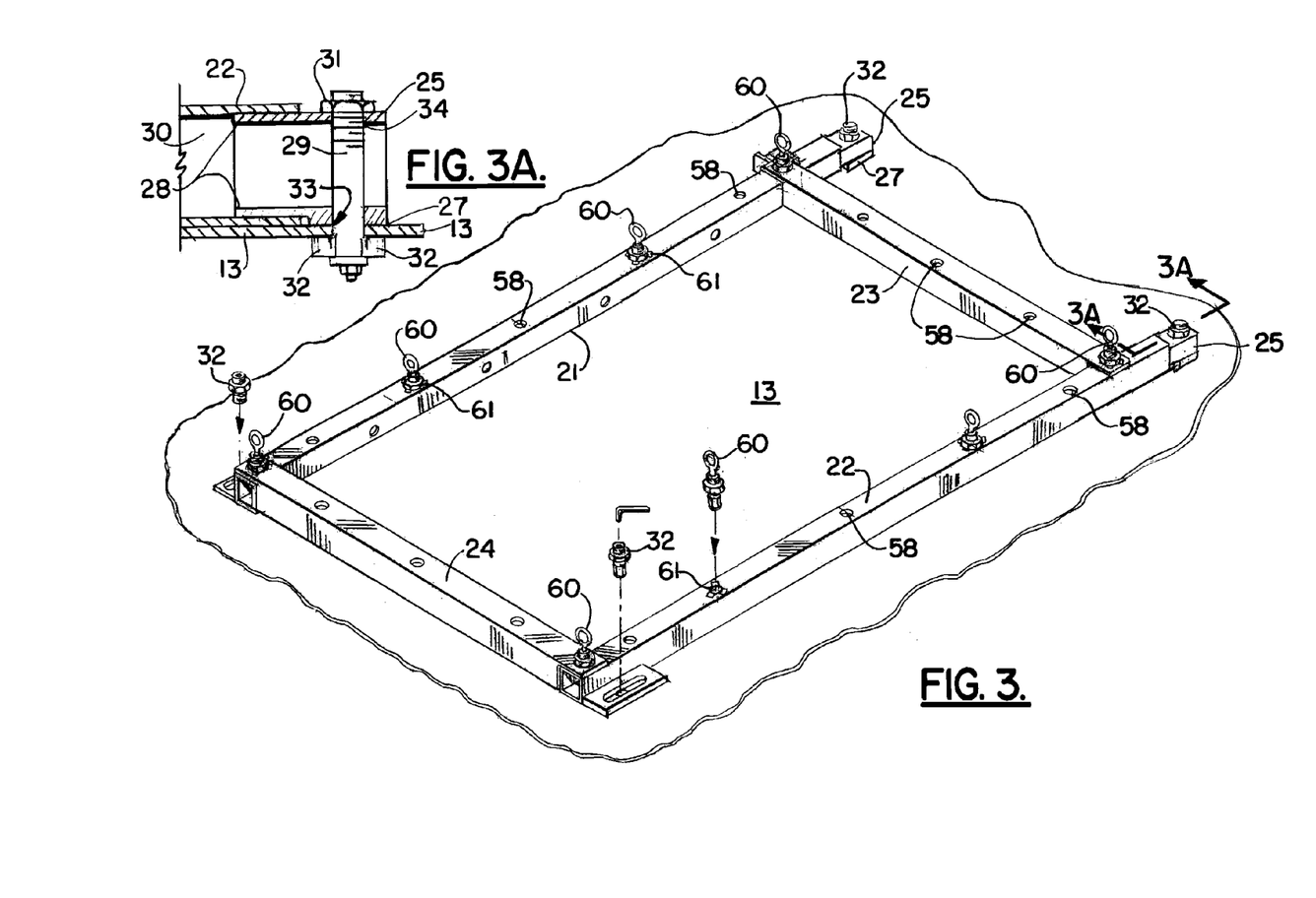
FIG. 3 is a partial perspective view of the preferred embodiment of the apparatus of the present invention.
FIG. 3a is a sectional view taken along lines 3a-3a of FIG. 3.

Vehicle cargo storage cargo system 10 provides a pair of longitudinal beams 21, 22 that are preferably parallel and one or more transverse beams 23, 24. These beams 21, 22, 23, 24 are shown in FIG. 3. The beams 23, 24 can be generally parallel and extend longitudinally, each beam 23, 24 being attached to bed 13 next to a bed wall 14 or 16. Each of the beams 21, 22 is preferably a transverse beam that is perpendicularly oriented to the beams 23, 24. In FIGS. 3-3A, the beams 21, 22 can be removably attached to forward anchors 25 that can be permanently or removably connected (for example, bolted) to truck bed 13. Forward anchor 25 (see FIG. 3A) can include a plate 26 having an opening 27 that is receptive of fastener 29. Fastener 29 can be a common bolted (i.e. bolt and nut and washer(s)) connection. However, the fastener 25 can also be a specially configured device indicated as locking member 32 in FIGS. 17-19 or the fastener shown and described in prior, application Ser. No. 10/071,786 filed Feb. 7, 2002 entitled "Toggle Bolt Device", hereby incorporated herein by reference.

Each forward anchor 25 can be in the form of a square tubing section 28 connected (e.g. welded) to plate 26 and that fits an open bore 30 of a longitudinal beam 21, 22. This type of a connection between anchor 25 and beam 22 is sometimes referred to as a stab fitting or stab type connection. When a fastener (e.g. bolted connection) 29 is used to secure anchor 25 to truck bed 13, a nut 31 can be used to complete the connection. However, a nut 31 can also be attached to the locking member 32 of FIGS. 17-19.

Truck bed 13 provides truck bed openings 33 that are receptive of any suitable fastener or a bolted connection 29 or a locking member 32. Openings at 33, 34 are provided so that fastener 29 or locking member 32 can extend through square tubing section 28, as well as the truck bed 13 as shown in FIG. 3A.

Figures 4, 5A:
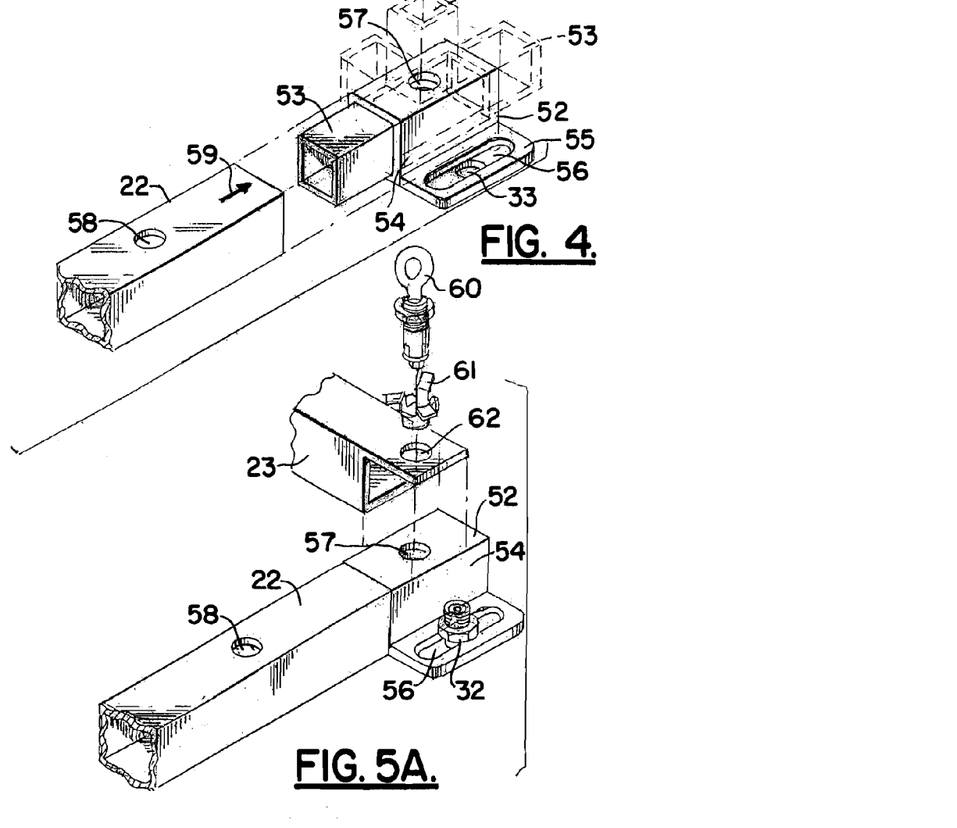
FIG. 4 is a fragmentary perspective view of the preferred embodiment of the apparatus of the present invention.
FIGS. 5A-5D are other fragmentary perspective views of the preferred embodiment of the apparatus of the present invention showing the anchor portion.
Figure 5B:
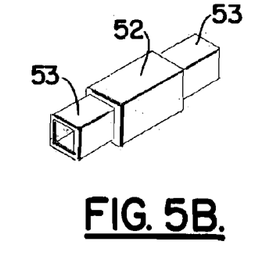
Figure 5C:
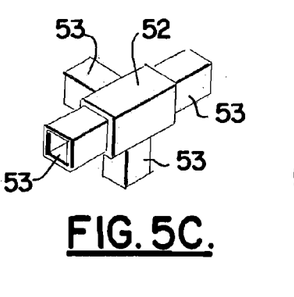
Figure 5D:
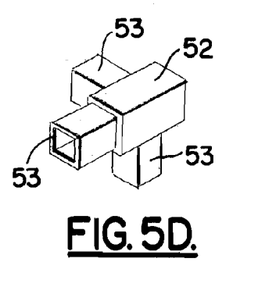

FIGS. 4 and 5A-5D show an alternate forward anchor 52. In FIG. 4, anchor 52 has a square tubing section 54 with attached stab fitting 53. Flange 55 is welded or otherwise attached to square tubing section 54. Slot 56 in flange 55 enables a connector 32 or a fastener/bolted connection 29 as shown in FIG. 3 to secure flange 55 and thus anchor 52 to truck bed 13. Openings 58 enable eyebolts 60 (or any other eyebolt) to be removably connected to beams 21, 22. Several such beam openings 58 can be provided at intervals along beams 21, 22, 23, 24 as seen in FIG. 3.

A selected beam 21 or 22 can be removably affixed to anchor 52 by connecting with stab fitting 53 as indicated by arrow 59 in FIG. 4.

In FIG. 5A, transverse beam 23 can attach to anchor 52 using fastener 29 or 32 or eyebolt 60 with insert 61. In such a case, openings 62 and 57 are aligned with insert 61 penetrating both of the openings 57, 62. In FIGS. 4 and 5B-5D, multiple stab fittings 53 can be provided with anchor 52 so that vertical beams can be used to build an upwardly extending frame having transverse beams and longitudinal beams at an elevated level(s) and/or for connecting one longitudinal or transverse beam to another.

Figure 1:
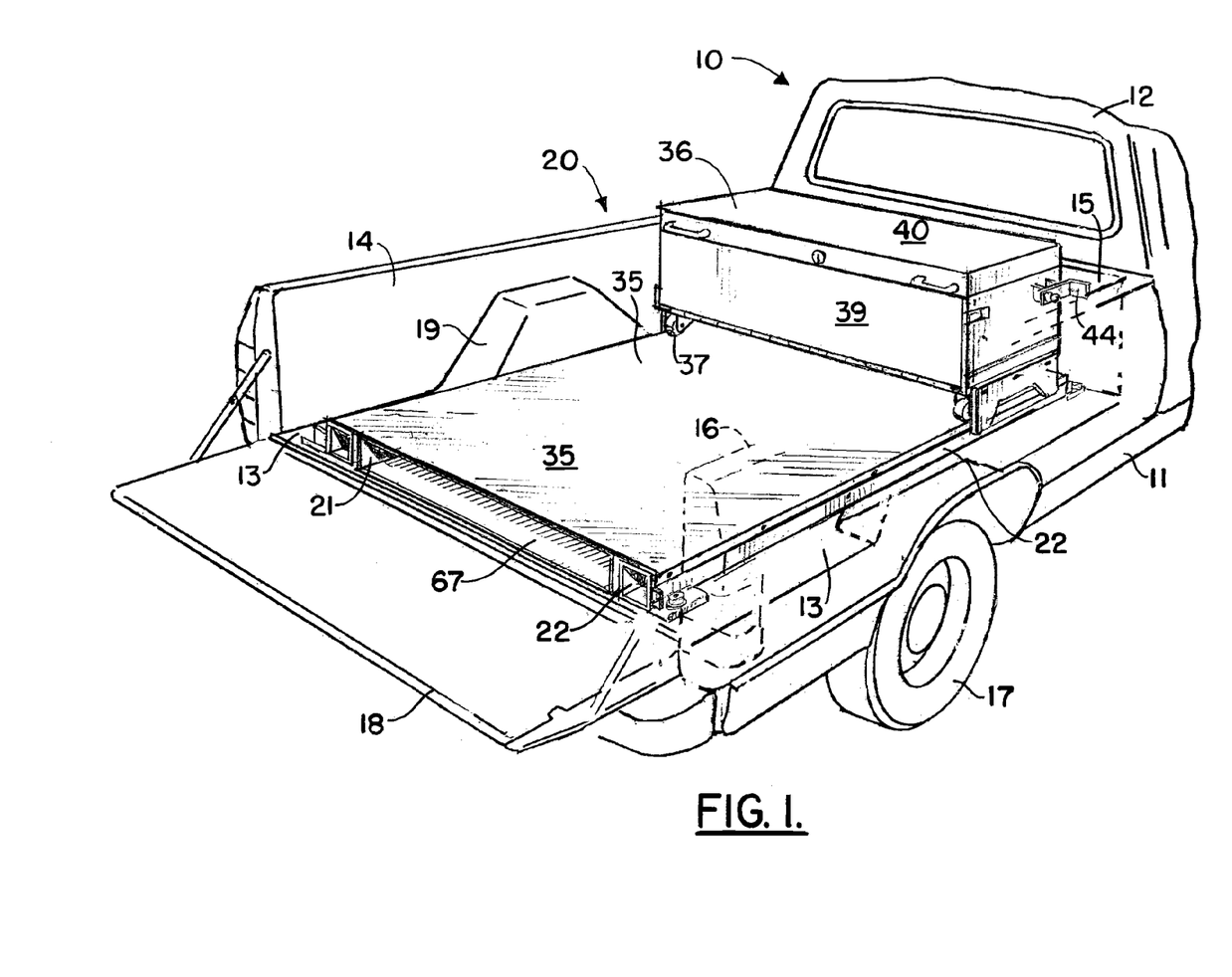
FIG. 1 is a perspective view of the preferred embodiment of the apparatus of the present invention.
Figure 6:
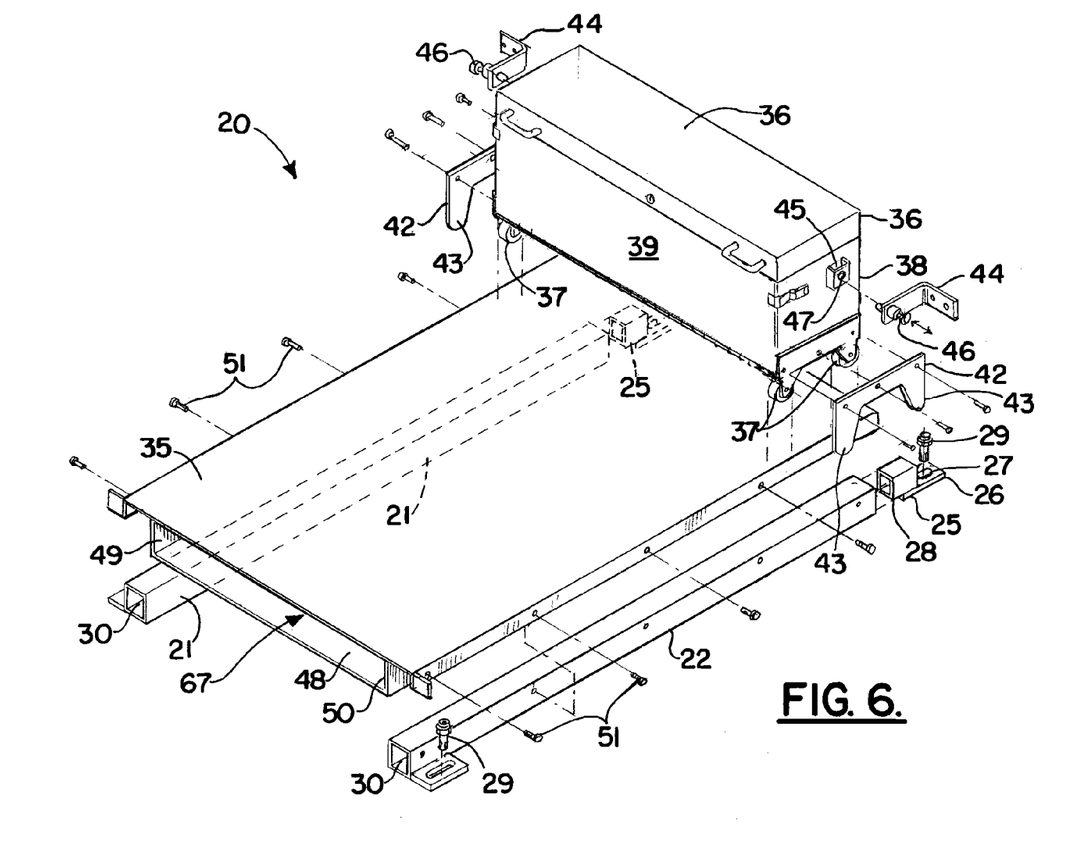
FIG. 6 is a partial exploded perspective view of the preferred embodiment of the apparatus of the present invention.
Figure 7:
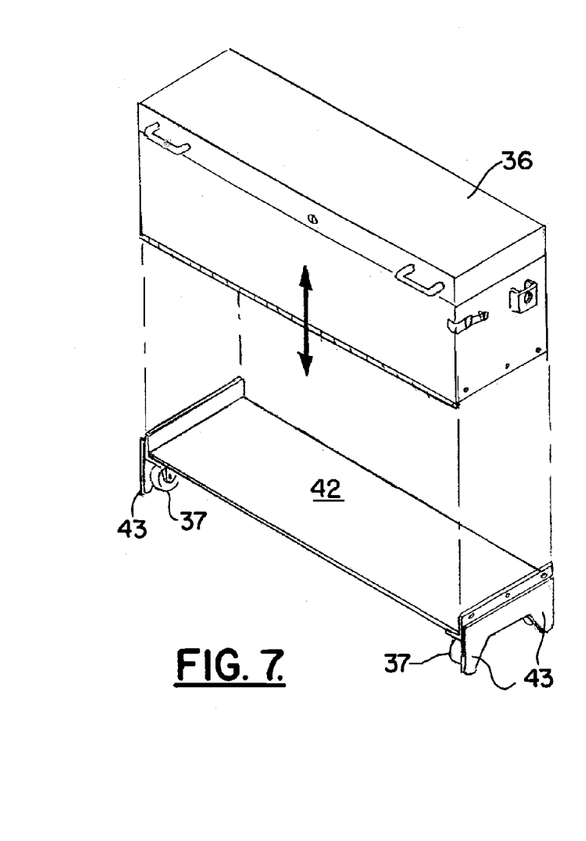
FIG. 7 is a fragmentary perspective view illustrating the toolbox accessory.

A platform or raised cargo box 35 can be attached to the beams 21, 22 and 23-24 as shown in FIGS. 1 and 6. Raised cargo deck 35 provides a deck 35A. Box 35 can support a number of different accessories and containers such as toolbox 36, grill 63, table 68, and/or storage boxes 64, 65, 66 or a ramp. The raised cargo deck 35 includes an under deck panel 48 connected at its edges to a pair of flanges 49, 50 that extend longitudinally and generally parallel to the longitudinal beams 21, 22. An interior 67 is receptive of storage boxes 64, 65, 66 or other accessories such as folding table 68.

Figure 2:
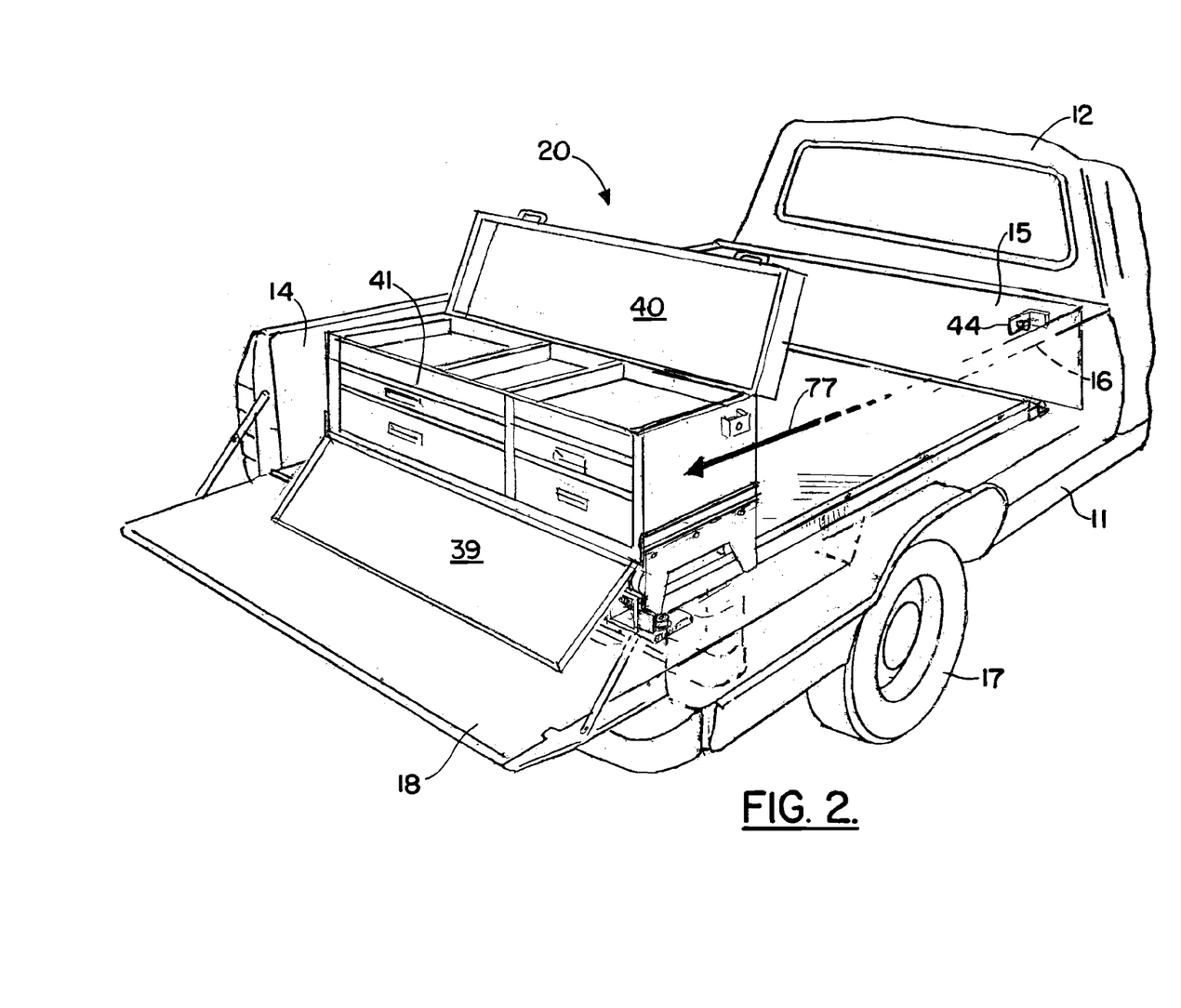
FIG. 2 is a perspective view of the preferred embodiment of the apparatus of the present invention.

Toolbox 36 is preferably wheeled so that it can travel between a position next to cab 12 as shown in FIG. 1 and a position shown in FIG. 2 near tailgate 18. This travel path is indicated schematically by arrow 77 in FIG. 1.

In FIG. 6, toolbox 36 provides casters 37 attached to body 38. The body 38 can have a hingedly mounted front panel 39 and a hingedly mounted lid or top panel 40. The two panels 39, 40 conceal a compartmentalized storage area 41 that can include for example a plurality of drawers. The toolbox 36 rests upon platform 42 that has a plurality of downwardly extending fingers 43. Fingers 43 engage the sides of raised cargo box 35, thus ensuring that the toolbox 36 will track a straight path when moving between the forward position of FIG. 1 and the rear position of FIG. 2. Latches 44 retain toolbox 36 (or grill 63) in the forward position of FIG. 1, next to cab 11. Each latch 44 includes a locking member 46 that can be spring loaded to engage aperture 47 of socket 45 on toolbox 36 (or grill 63). The toolbox 36 (or grill 63) is released to travel to the rearward position of FIG. 2 by pulling locking member 46 overcoming spring pressure.

Figure 8:
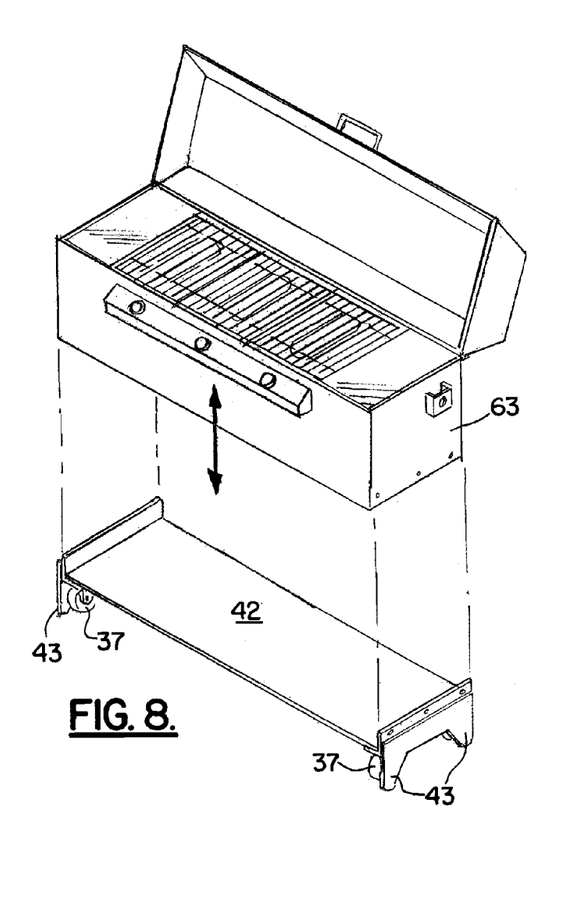
FIG. 8 is a fragmentary perspective view illustrating the grill accessory.
Figure 9:
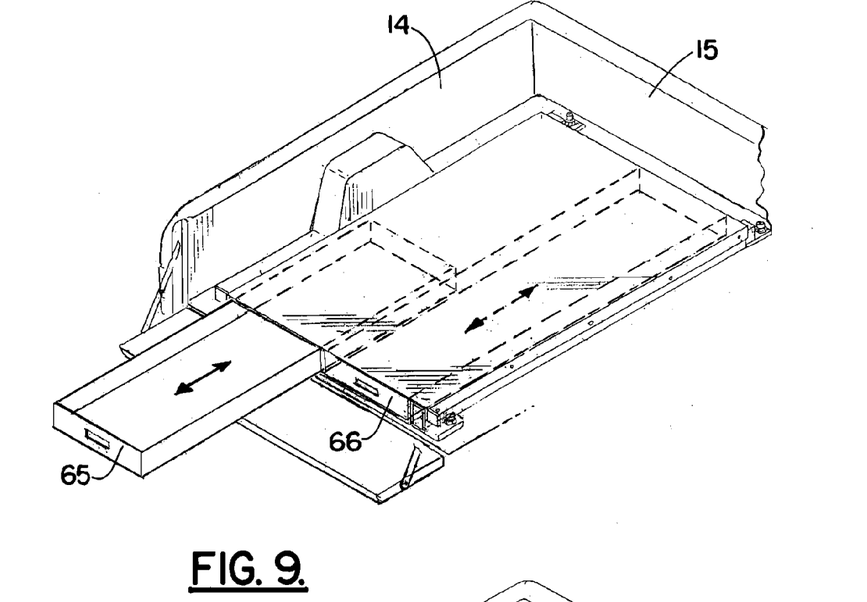
FIG. 9 is a partial perspective view of the preferred embodiment of the apparatus of the present invention showing one of the cargo boxes that is housed in the under deck storage area.
Figure 10:
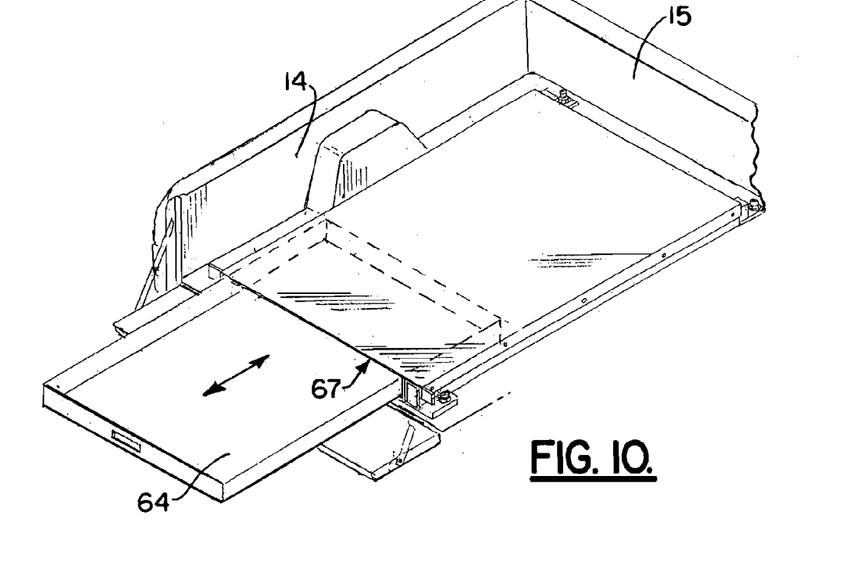
FIG. 10 is a partial perspective view of the preferred embodiment of the apparatus of the present invention showing one of the cargo boxes that is housed in the under deck area.
Figure 11:
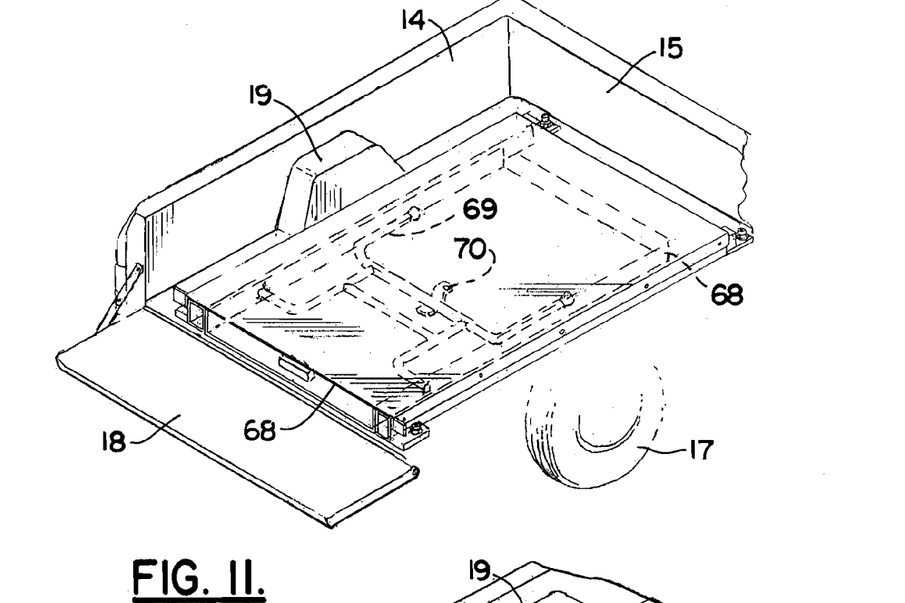
FIG. 11 is a fragmentary perspective view of the preferred embodiment of the apparatus of the present invention showing an alternate accessory in the form of a folding table in its folded position.
Figure 12:
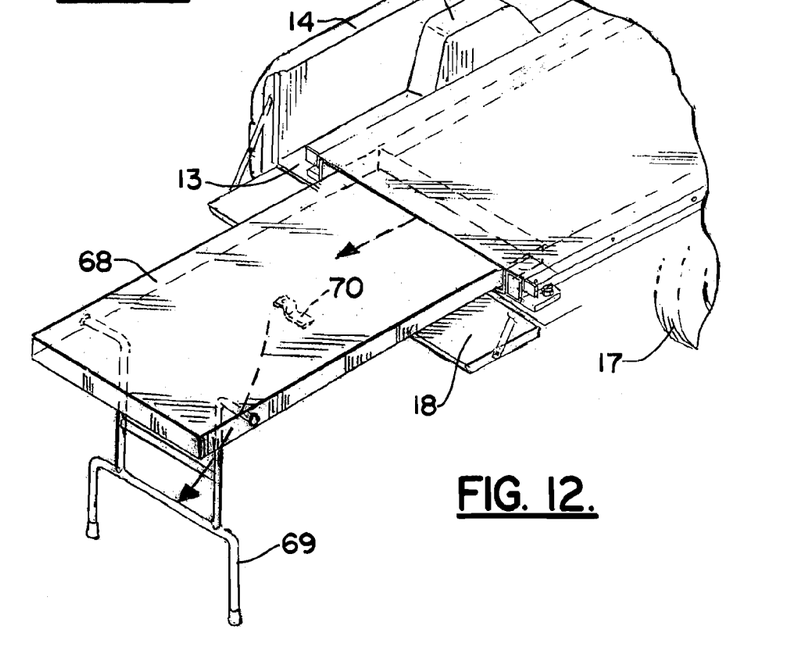
FIG. 12 is a fragmentary perspective view of the preferred embodiment of the apparatus of the present invention showing an alternate accessory in the form of a folding table in an operating position.

Another accessory that can be mounted upon platform 42 is the grill 63 shown in FIG. 8. In addition to the storage boxes 64, 65, 66 that can be stored with an interior 67 of raised cargo box 35, a table 68 can also be stored in that area. Table 68 is shown in FIG. 11 in a stored position. In FIG. 12, the table 68 has been pulled to an expanded, operating position wherein leg frame 69 has been unfolded to an operating position, released from its retainer 70. In FIG. 12, a part of the table is supported by leg frame 69. The opposing end portion of the table 68 remains housed with an interior 67 of raised cargo deck 35 thus being supported by the cargo deck 35 and the truck 20. In FIG. 12, the tailgate 18 assumes a lowered, open position.

It is possible to carry loads inside of the beams 21, 22, 23, 24 when the raised cargo deck 35 is not in place. In such a situation, a plurality of eyebolts 60 can be attached to a selected one of the beams 21, 22, 23, 24 by attaching insert 61 to a selected opening 58. Alternatively, common threaded eyebolts can be attached using a nut and washer(s).

Figure 13:
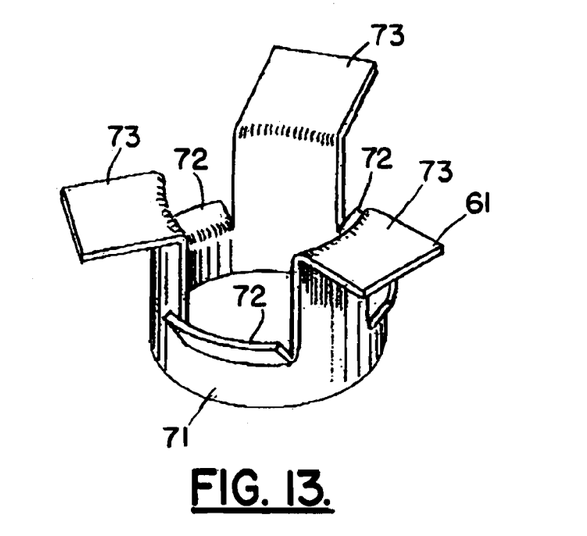
FIG. 13 is a partial perspective view that shows an insert portion that is used with a fastener for attachment to one of the beams of the apparatus of the present invention.
Figure 14:
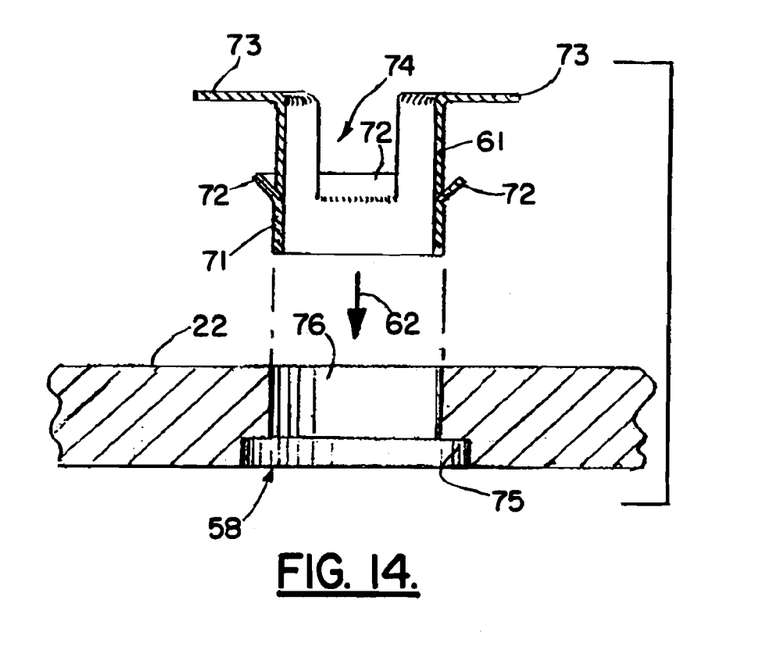
FIG. 14 is a sectional view of the insert shown in FIG. 13.

In FIGS. 13 and 14, insert 61 can be seen as including a cylindrical portion 71 that supports a plurality of lower diagonally extending angled tabs 72 in a plurality of upper angled tabs 73 that extend at about right angles to the cylindrical portion 71 and thus generally parallel with the upper surface of the beam 22 to which it is attached as shown in FIG. 14. A gap 74 is seen above each tab 72 in FIG. 14. Opening 58 includes a larger diameter section 75 and a smaller diameter section 76.

Figure 15:
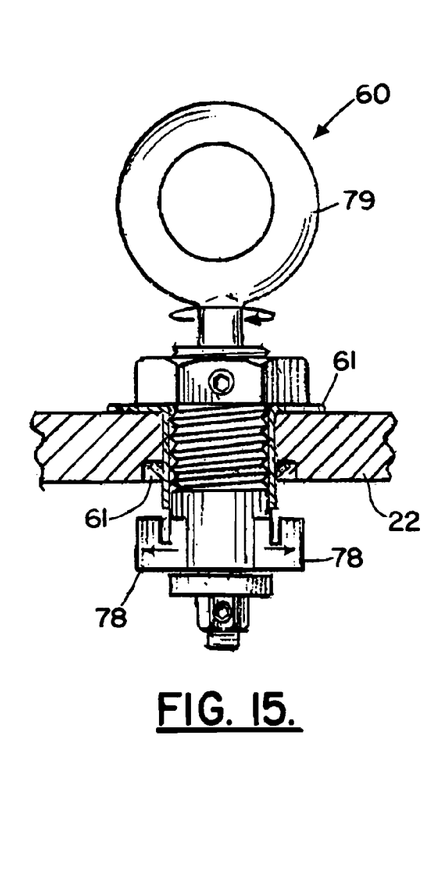
FIGS. 15 and 16 are elevation views of an eyebolt that can be used with the insert of FIGS. 13-14.
Figure 16:
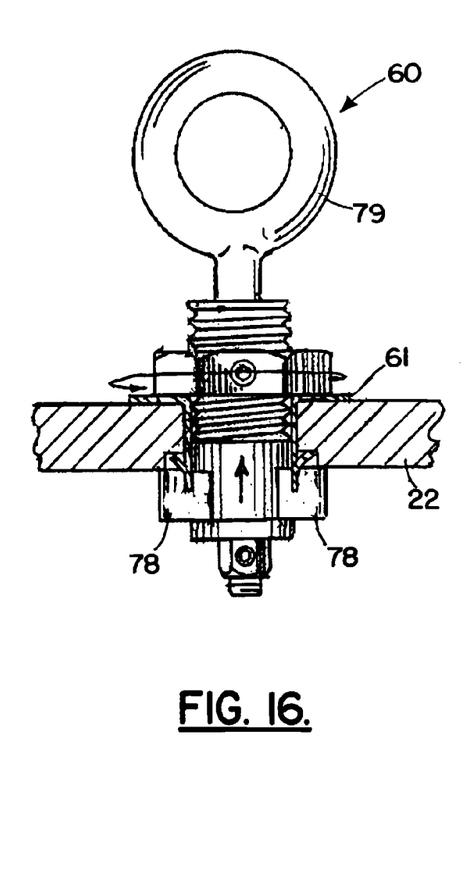

Upon insertion, the tabs 72 engage the larger diameter section 75 and expand to fit into it as shown in FIGS. 15 and 16 when eyebolt 60 is connected to the combination of insert 61 and beam 22 at opening 58. The distance between tabs 72, 73 can be selected to suit the thickness of the material (e.g.

square tubing) to be drilled with opening 58, or when two beams such as 22, 23 are to be fitted with an insert 61 (see FIGS. 4-5) and a fastener or eyebolt 29, 32, 60. Eyebolt 60 can be provided with lower projecting members 78 that automatically extend when eyelet 79 is rotated.

Figure 17:
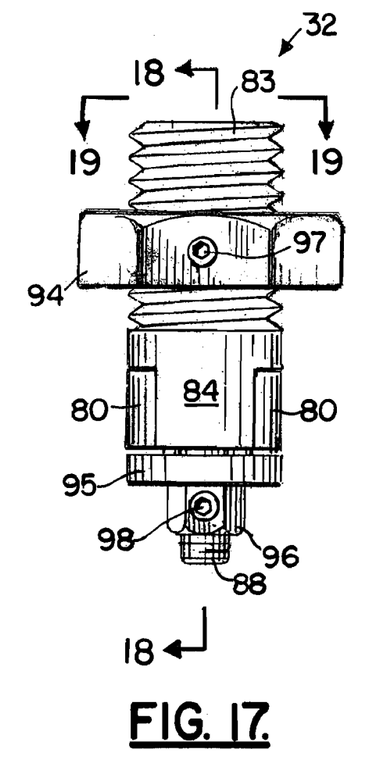
FIG. 17 is an elevation view of a fastener portion of the preferred embodiment of the apparatus of the present invention.
Figure 18:
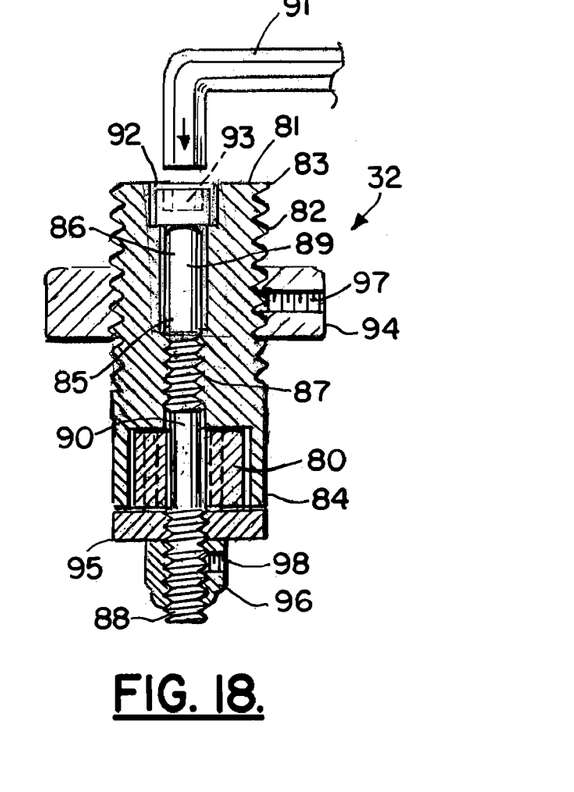
FIG. 18 is a sectional view taken along lines 18-18 of FIG. 17.
Figure 19:
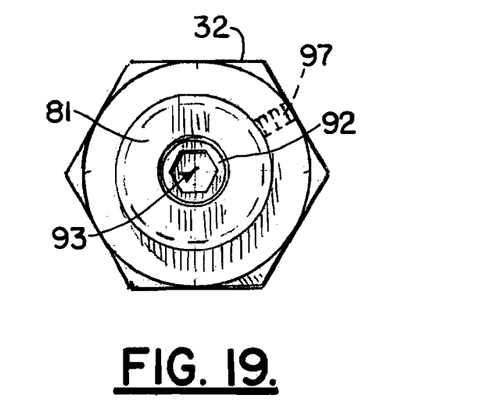
FIG. 19 is an end view taken along lines 19-19 of FIG. 17.

The mechanism that extends the projecting members 78 can be the same as the mechanism of prior application Ser. No. 10/071,786 that extends projecting members 80 of fastener 32 and is illustrated in FIGS. 17-19. Fastener 32 has a cylindrically shaped body 81 having external threads 82 at its upper end portion 83 and can be unthreaded at its lower end portion 84. Central bore 85 receives shaft 86 which is threaded at 87, 88 and unthreaded at 89, 90. Bore 85 is correspondingly shaped to receive shaft 86. Projecting members 80 move to an extended position when shaft 86 is rotated using wrench 91.

Shaft 86 provides head 92 with tool receptive socket (e.g. hexagonal) 93. Nut 94 engages the threads 82 so that it can be tightened against projecting members 80 once they are extended (see for example prior application Ser. No. 10/071, 786 for operation of projecting members 80 when shaft 86 is rotated). Disk 95 threadably engages shaft 86 at threads 88. Lock nut 96 retains disk 95 in position upon shaft 86 at threads 88. Set screws 97, 98 can be used to affix the position of each nut 94, 96.

Figure 20:
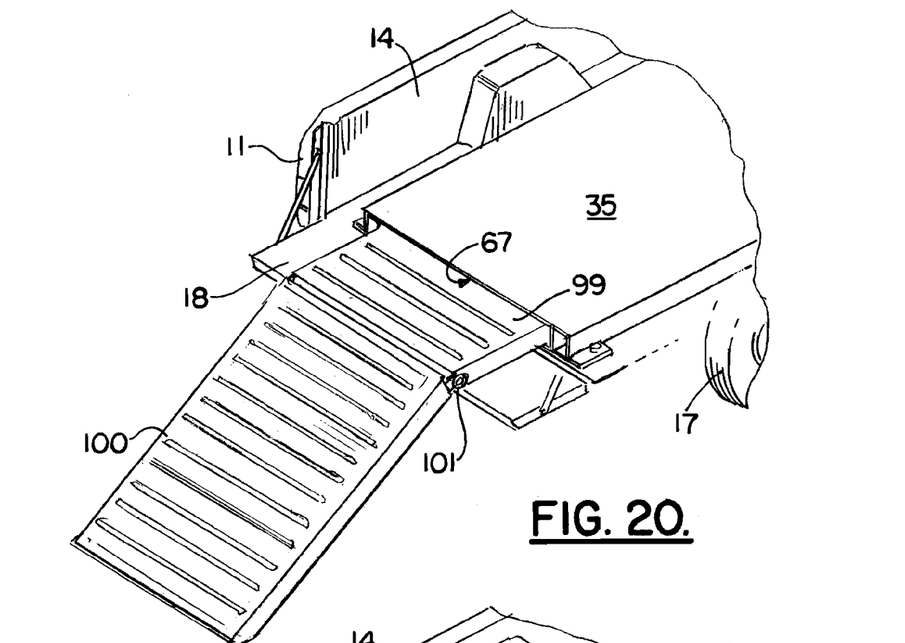
FIGS. 20-21 are perspective views showing the preferred embodiment of the apparatus of the present invention with optional loading ramps.
Figure 21:
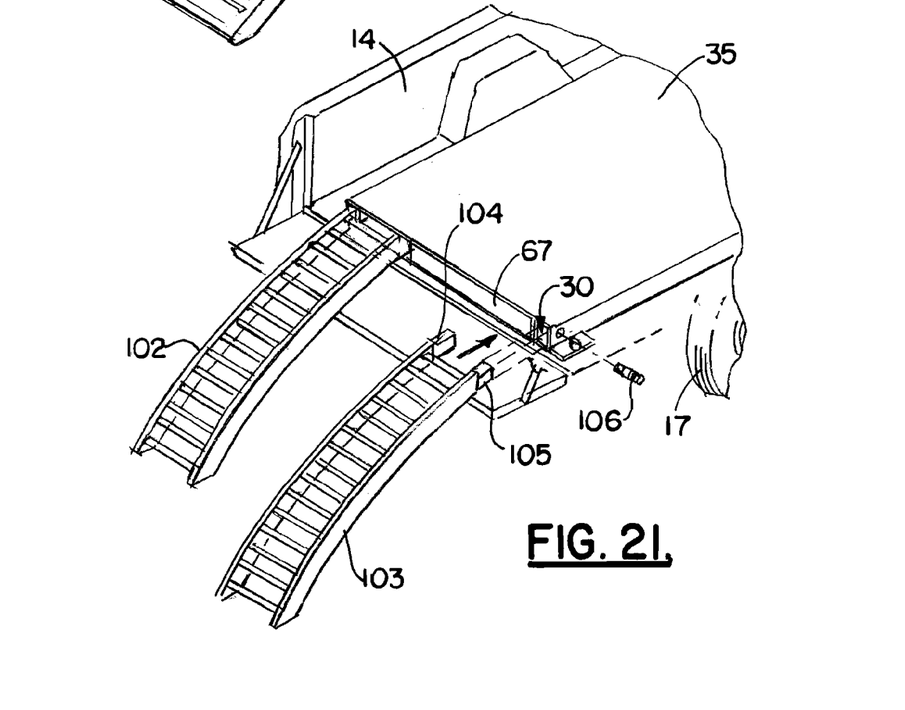

FIGS. 20-21 illustrate that a ramp or ramps can connect to cargo box 35. Ramp sections 99,100 define a hinged ramp with the sections 99, 100 connected at hinge 101. Part of ramp section 99 is received into interior 67 of cargo box 35 as shown in FIG. 20 and can be locked in place with a locking pin or pins (not shown). In FIG. 21, two ramps 102, 103 are connected to the left and right sides of cargo box 35 using stab fittings 104, 105 provided at the top of each ramp 102, 103. The stab fitting 104 is inserted into interior 67 of cargo box 67 while the stab fitting 105 is inserted into bore 30 of longitudinal beam 22, held in place with locking pin 106. Similarly, a stab fitting 105 of ramp 102 inserts into bore 30 of longitudinal beam 21. Either ramp arrangement of FIG. 20 or 30 could be used to load a smaller vehicle such as an all terrain vehicle, lawnmower, small tractor or golf cart to the upper surface of cargo box 35.

The following is a list of parts and materials suitable for use in the present invention. Fastener 32 of FIGS. 17-19 can also be used with an insert 61.

PARTS LIST

| Part Number | Description |
| --- | --- |
| 10 | vehicle cargo storage system |
| 11 | body |
| 12 | cab |
| 13 | bed |
| 14 | bed wall |
| 15 | bed wall |
| 16 | bed wall |
| 17 | wheel |
| 18 | tailgate |
| 19 | wheel well |
| 20 | truck |
| 21 | longitudinal beam |
| 22 | longitudinal beam |
| 23 | transverse beam |
| 24 | transverse beam |
| 25 | forward anchor |
| 26 | plate |
| 27 | opening |
| 28 | square tubing section |
| 29 | fastener/bolted connection |

-continued
PARTS LIST

| Part Number | Description |
| --- | --- |
| 30 | open bore |
| 31 | nut |
| 32 | fastener |
| 33 | truck bed opening |
| 34 | opening |
| 35 | raised cargo box |
| 36 | toolbox |
| 37 | caster |
| 38 | body |
| 39 | front panel |
| 40 | top panel |
| 41 | storage area |
| 42 | platform |
| 43 | finger |
| 44 | latch |
| 45 | socket |
| 46 | locking member |
| 47 | aperture |
| 48 | under deck |
| 49 | flange |
| 50 | flange |
| 51 | fastener |
| 52 | forward anchor |
| 53 | stab fitting |
| 54 | square tubing section |
| 55 | flange |
| 56 | slot |
| 57 | opening |
| 58 | opening |
| 59 | arrow |
| 60 | eyebolt |
| 61 | insert |
| 62 | opening |
| 63 | grill |
| 64 | storage box |
| 65 | storage box |
| 66 | storage box |
| 67 | interior |
| 68 | folding table |
| 69 | folding leg frame |
| 70 | retainer |
| 71 | cylindrical portion |
| 72 | lower angled tab |
| 73 | upper angled tab |
| 74 | gap |
| 75 | larger diameter section |
| 76 | smaller diameter section |
| 77 | arrow |
| 78 | projecting member |
| 79 | eyelet |
| 80 | projecting member |
| 81 | body |
| 82 | threads |
| 83 | upper end portion |
| 84 | lower end portion |
| 85 | bore |
| 86 | shaft |
| 87 | threaded section |
| 88 | threaded section |
| 89 | unthreaded section |
| 90 | unthreaded section |
| 91 | wrench |
| 92 | head |
| 93 | socket |
| 94 | nut |
| 95 | disk |
| 96 | nut |
| 97 | set screw |
| 98 | set screw |
| 99 | first ramp section |
| 100 | second ramp section |
| 101 | hinge |
| 102 | left ramp |
| 103 | right ramp |
| 104 | stab fitting |

-continued

PARTS LIST

| Part Number | Description |
|---|---|
| 105 | stab fitting |
| 106 | locking pin |

The foregoing embodiments are presented by way of example only; the scope of the present invention is to be limited only by the following claims.

The invention claimed is:

1. A vehicle cargo storage system for use with a vehicle having a load carrying bed and a pair of opposed bed walls that extend above the load carrying bed, comprising:
   a) a frame that is anchored to a vehicle at its load carrying bed and not anchored to either of the bed walls, the frame including a pair of longitudinal beams and a pair of transverse beams that define together a generally rectangular shape;
   b) the beams including at least one hollow beam with a hollow bore and a beam wall surrounding the bore, the beam wall having multiple attachment openings, and wherein one or more anchor bolts are removably attachable to the hollow beam at selected attachment openings;
   c) a cargo module affixable to the frame, the module including an upper deck and a lower cargo carrying receptacle;
   d) a plurality of accessories that optionally fit the cargo module including at least one accessory affixable to the upper deck and traveling between fore and aft positions thereupon and at least one accessory sized and shaped to fit the receptacle; and
   e) a plurality of tie down anchor bolts that are attachable to the frame when either there is no cargo module attached to the frame or when there is no accessory affixed to the module upper deck, at least some of the anchor bolts providing eyelets that accept tie down straps, and wherein each anchor bolt is connectable to a beam at a beam opening, an enlarged part of the anchor bolt occupying a position within the bore.

2. The vehicle cargo storage system of claim 1 wherein the frame has frame corners and the frame is attached to the vehicle cargo bed at the corners.

3. The vehicle cargo storage system of claim 1 wherein at least one of the beams is hollow, providing a bore surrounded by a beam wall.

4. The vehicle cargo storage system of claim 3 wherein there are openings in each beam wall.

5. The vehicle cargo storage system of claim 1 wherein each of the beams is hollow, each beam providing a bore surrounded by a beam wall.

6. The vehicle cargo storage system of claim 5 wherein the eye bolts attach to selected ones of the beams by extending through a beam wall to communicate with a beam bore.

7. The vehicle cargo storage system of claim 1 wherein one of the accessories rolls upon the combination of frame and cargo module.

8. The vehicle cargo storage system of claim 1 further comprising fittings that enable upwardly extending members to be connected to the frame.

9. A vehicle cargo storage system for use with a vehicle load carrying bed comprising:
   a) a frame that attaches to a vehicle at its load carrying bed; the frame including a pair of longitudinal beams and a pair of transverse beams that define together a generally rectangular shape;
   b) a cargo module affixable to the frame, the module including an upper deck and a lower cargo carrying receptacle;
   c) a plurality of accessories that optionally fit the cargo module including at least one accessory affixable to the upper deck and traveling between fore and aft positions thereupon and at least one accessory sized and shaped to fit the receptacle;
   d) a plurality of tie down anchor bolts that are attachable to the frame when either there is no cargo module attached to the frame or when there is no accessory affixed to the module upper deck, at least some of the anchor bolts providing eyelets that accept tie down straps; and
   e) wherein some of the anchor bolts connect a beam of the frame to the vehicle load carrying bed.

10. A vehicle cargo storage system for use with a vehicle load carrying bed and a pair of opposed bed walls that extend above the load carrying bed, comprising:
   a) a frame that attaches to a vehicle at its load carrying bed; the frame including a pair of longitudinal beams and a pair of transverse beams that define together a generally rectangular shape;
   b) a cargo module affixable to the frame, the module including an upper deck and a lower cargo carrying receptacle;
   c) a plurality of accessories that optionally fit the cargo module including at least one accessory affixable to the upper deck and traveling between fore and aft positions thereupon and at least one accessory sized and shaped to fit the receptacle;
   d) the beams including at least one hollow beam with a hollow bore and a beam wall surrounding the bore, the beam wall having multiple attachment openings, and wherein one or more anchor bolts are removably attachable to the hollow beam at selected attachment openings;
   e) connections that enable connection of a transverse beam to the longitudinal beams at spaced apart positions that are at varying distances from the passenger compartment; and
   f) wherein the connections include a connector that is connectable to the beam by passing through an opening in the beam wall and being expandable in part inside the bore.

11. The vehicle cargo storage system of claim 10 further comprising fittings that enable upwardly extending members to be connected to the frame.

12. A vehicle and cargo storage system for use with a vehicle having a load carrying bed and a pair of opposed bed walls that extend above the load carrying bed, comprising:
   a) a truck having a body with a passenger compartment, a load carrying bed and a pair of longitudinally extending bed walls that extend along the sides of the bed;
   b) a pair of longitudinally extending beams that are anchored to the load carrying bed and not to the bed walls;
   c) each of the beams being hollow, and including a beam wall surrounding a bore;
   d) a plurality of attachment positions along each beam;
   e) a plurality tie down fittings that each removably attach to the beam wall at a selected attachment position, at least some of the tie down fittings providing eyelets; and
   f) wherein each tie down fitting includes an enlarged part that occupies a position within the bore.

13. The vehicle cargo storage system of claim 12 further comprising a platform that is supported by the beams.

14. The vehicle cargo storage system of claim 12 further comprising an accessory that is movably mounted to the beams, being movable between a position next to the passenger compartment and a position spaced away from the passenger compartment.

15. The vehicle cargo storage system of claim 14 wherein there are multiple accessories that are mounted to the beams.

16. The vehicle cargo storage system of claim 12 further comprising transverse beams and wherein removable connections connect the transverse beam to the longitudinal beams.

17. The vehicle cargo storage system of claim 16 wherein bolted connections comprise the removable connections.

18. The vehicle cargo storage system of claim 17 wherein some of the bolted connections include eyebolts.

19. The vehicle cargo storage system of claim 12, further comprising a cargo module supported upon the frame and wherein one of the accessories rolls upon the combination of beams and cargo module.

20. The vehicle cargo storage system of claim 12 further comprising fittings that enable upwardly extending members to be connected to the frame.

21. A vehicle and cargo storage system, comprising:
 a) a truck having a body with a passenger compartment, a load carrying bed and a pair of longitudinally extending bed walls that extend along the sides of the bed;
 b) a load carrying frame that attaches to a vehicle at the load carrying bed, the frame including a pair of longitudinally extending beams that are positioned next to the bed walls, and at least one transverse beam that connects to each of the longitudinal beams;
 c) each of the beams being hollow, and including a beam wall surrounding a bore;
 d) a plurality of beam openings in the beam wall;
 e) a plurality tie down fittings that each removably attach to the beam wall at a selected opening, at least some of the tie down fittings providing eyelets;
 f) wherein anchor bolts connect a beam of the frame to the vehicle load carrying bed; and
 g) wherein some of the anchor bolts include eyebolts.

22. A vehicle and cargo storage system, comprising:
 a) a truck having a body with a passenger compartment, a load carrying bed and a pair of longitudinally extending bed walls that extend along the sides of the bed;
 b) a load carrying frame that attaches to a vehicle at the load carrying bed, the frame including a pair of longitudinally extending beams that are positioned next to the bed walls, and at least one transverse beam that connects to each of the longitudinal beams;
 c) each of the beams being hollow, and including a beam wall surrounding a bore;
 d) a plurality of beam openings in the beam wall;
 e) a plurality of fixtures that each removably attach to the frame at a beam opening, each fixture including a rotatable shaft and having proximal and distal end portions, extendable members mounted to the shaft distal end portion, and wherein rotation of the shaft enables selective extension or retraction of the extendable members so that a fixture can be anchored to the frame by inserting the distal end portion through a frame opening until the distal end portion occupies the bore and rotating the shaft to extend the extendable members.

23. The vehicle cargo storage system of claim 22 wherein the frame has frame corners and the frame is attached to the vehicle cargo bed at the corners.

24. The vehicle cargo storage system of claim 22 wherein some of the anchor bolts connect a beam of the frame to the vehicle load carrying bed.

25. The vehicle cargo storage system of claim 22 further comprising a vehicle having a load carrying bed.

26. The vehicle cargo storage system of claim 22 further comprising one or more accessories that roll upon the load carrying frame, longitudinal beams.

27. The vehicle and cargo storage system of claim 22 wherein the connections include a connector that is connectable to the beam by passing through an opening in the beam wall and being expandable in part inside the bore.

28. The vehicle cargo storage system of claim 22 further comprising an accessory that is movably mounted to the frame, being movable between a position next to the passenger compartment and a position spaced away from the passenger compartment.

29. The vehicle cargo storage system of claim 28 wherein there are multiple accessories that are mounted to the frame.

30. The vehicle cargo storage system of claim 22 further comprising fittings that enable upwardly extending members to be connected to the frame.

31. A vehicle cargo storage system for use with a vehicle having a load carrying bed and a pair of opposed bed walls that extend above the load carrying bed comprising:
 a) a frame that attaches to a vehicle at its load carrying bed; the frame including a pair of longitudinal beams and a pair of transverse beams that define together a generally rectangular shape;
 b) a cargo module affixable to the frame, the module including an upper deck and a lower cargo carrying receptacle;
 c) a plurality of accessories that optionally fit the cargo module including at least one accessory affixable to the upper deck and traveling between fore and aft positions thereupon and at least one accessory sized and shaped to fit the receptacle;
 d) the beams including at least one hollow beam with a hollow bore and a beam wall surrounding the bore, the beam wall having multiple attachment openings, and wherein one or more anchor bolts are removably attachable to the hollow beam at selected attachment openings; and
 e) fittings that enable upwardly extending members to be connected to the frame.

* * * * *